United States Patent [19]

Hayashi

[11] Patent Number: 4,734,787
[45] Date of Patent: Mar. 29, 1988

[54] ORIGINAL READER

[75] Inventor: Kimiyoshi Hayashi, Tokyo, Japan

[73] Assignee: Canon Kabushiki Kaisha, Tokyo, Japan

[21] Appl. No.: 23,968

[22] Filed: Mar. 10, 1987

Related U.S. Application Data

[63] Continuation of Ser. No. 632,879, Jul. 20, 1984, abandoned.

[30] Foreign Application Priority Data

Jul. 29, 1983 [JP] Japan ................................ 58-140006
Jul. 29, 1983 [JP] Japan ................................ 58-140007

[51] Int. Cl.⁴ .......................... H04N 1/40; H04N 1/10
[52] U.S. Cl. ...................................... 358/293; 358/280
[58] Field of Search ................ 358/213, 280, 293, 294

[56] References Cited

U.S. PATENT DOCUMENTS 4,432,017  2/1984  Stoffel et al. ........................ 358/213
4,438,457  3/1984  Tandon et al. ....................... 358/213
4,471,375  9/1984  Oritsuki et al. ....................... 357/68

Primary Examiner—Howard W. Britton
Assistant Examiner—John K. Peng
Attorney, Agent, or Firm—Fitzpatrick, Cella, Harper & Scinto

[57] ABSTRACT

There is disclosed an original reader capable of reading original image with a high fidelity. The original reader has a plurality of line sensors each having a plurality of photosensor elements, said line sensors being so arranged that the read lines of adjacent line sensors differ. Said plurality of line sensors and an original are relatively moved in scanning direction and vertical direction of said plurality of line sensors. An analog output of the line sensor which scans the original before others of said plurality of line sensors is delayed by a predetermined time.

17 Claims, 9 Drawing Figures

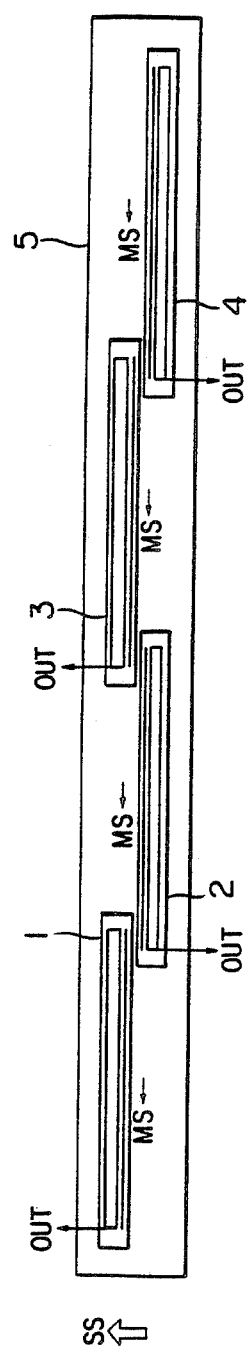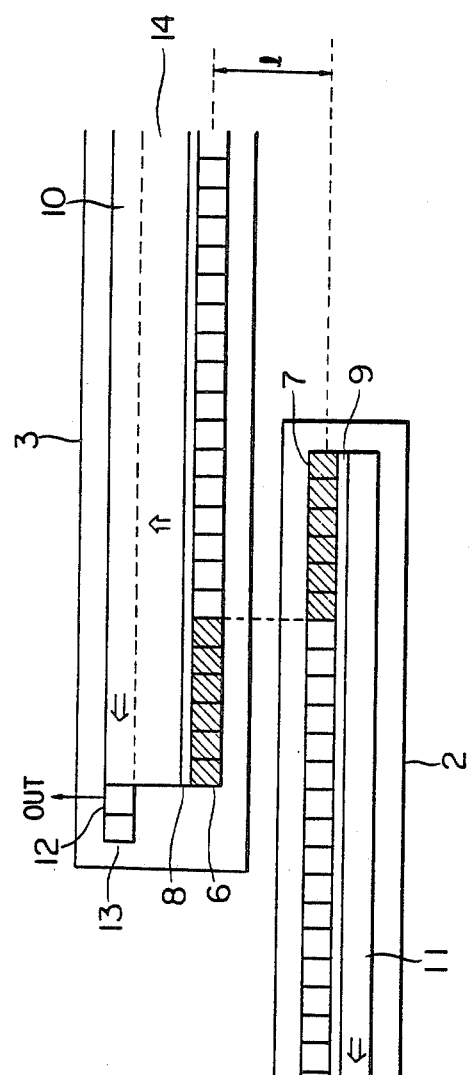

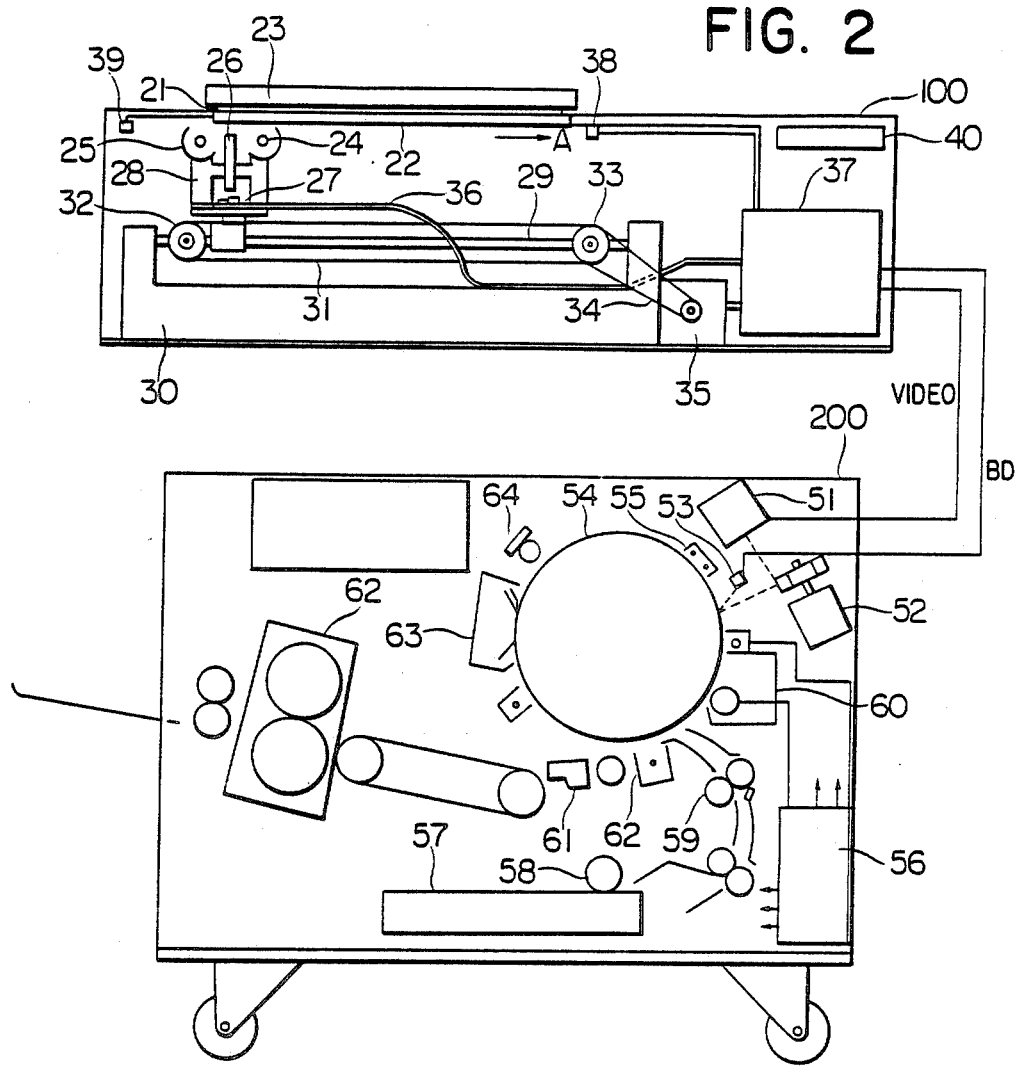
FIG. 2
FIG. 3
READ LINE OF CHIP 1 (SH 1)
READ LINE OF CHIP 2 (SH 2)

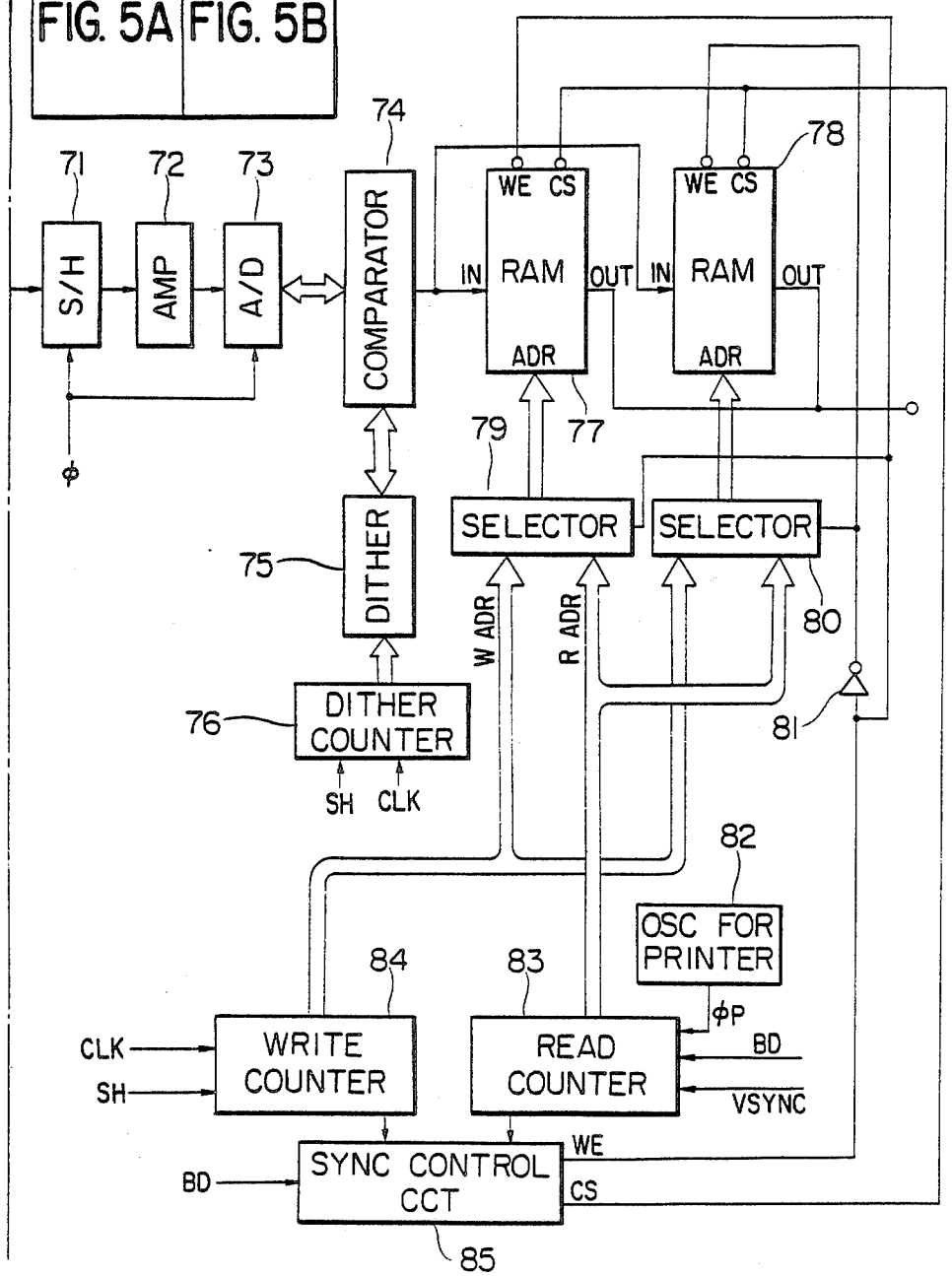

ORIGINAL READER

This is a continuation of application Ser. No. 632,879, filed July 20, 1984.

BACKGROUND OF THE INVENTION

1. Field of the Invention

The present invention relates to the field of original readers for photoelectrically reading original image information.

2. Description of the Prior Art

Line sensors wherein photosensor elements typically comprised of a plurality of amorphous silicon elements are arranged in a line in the widthwise direction of the original to be read have been known for reading the shading of original images photoelectrically. To perform real size reading in the widthwise direction (about 210 mm) of an A4 size original at the resolution of 16 picture elements/mm, a single line sensor having about 3,500 phtotsensor elements on about 300 mm substrate would be required. The problem is, however, that to form many photosensor elements such as above on a substrate without omission and at a nearly uniform sensitivity is difficult, and accordingly it is not practical in terms of cost, unless yield, etc. are improved.

In connection with the above problem, a design may be proposed in which a plurality of line sensors comprising about 1000 photosensor elements in the scanning direction are arranged and the image of a line is read divided by individual line sensors. Since in this method the number of the photosensor elements to be formed on a substrate is not so great, the problem of yield improvement and accompanying cost related problem can be solved to some extent.

However, since ineffective bits that cannot be used in the image reading exist at both ends of the line sensor, when a plurality of line sensors are arranged on a line, there occur unreadable areas. The plurality of line sensors, therefore, may be arranged so that the read lines of adjacent line sensors differ, typcially, in zigzag fashion.

When a plurality of line sensors are arranged in zigzag fashion, adjacent line sensors would perform read scanning of different original surfaces. Accordingly, when the original and the line sensors are caused to perform relative movement in the direction orthogonal to the read scanning direction for reading the original surface, there occur a difference in position, and a difference in time corresponding thereto, between a signal from the line sensor of the first line which scans the original first and a signal from the following line sensor of the second line.

In a copying equipment requiring a high resolution of 16 picture elements per 1 mm typically, that a copied image is affected by such difference in reading is not preferable. In the case of a colour image, it has been evidenced that such difference affects the colour balance.

SUMMARY OF THE INVENTION

An object of the present invention is to provide an original reader capable of reading original images with a high fidelity.

A further object of the present invention is to provide an original reader which performs read scanning, dividing the original by a plurality of lines of line sensors and which has solved the aforementioned problems in the split read scanning.

A further object of the present invention is to provide an original reader of a simple structure capable of good original reading.

A further object of the present invention is to provide an original reader suitable for contact type image reading.

The novel features which are believed to be characteristic of this invention, the above objectives and other objectives, and operation together with advantages thereof will be better understood from the following description.

BRIEF DESCRIPTION OF THE DRAWINGS

FIG. 1A is a schematic view of the photosensor surface of a multichip CCD sensor according to the invention;

FIG. 1B is an enlarged view of the junction part of the line sensor chips;

FIG. 2 is a view showing the structure of a copying equipment;

FIG. 3 is a timing chart showing read operation;

DETAILED DESCRIPTION OF THE PREFERRED EMBODIMENTS

Figure 4:
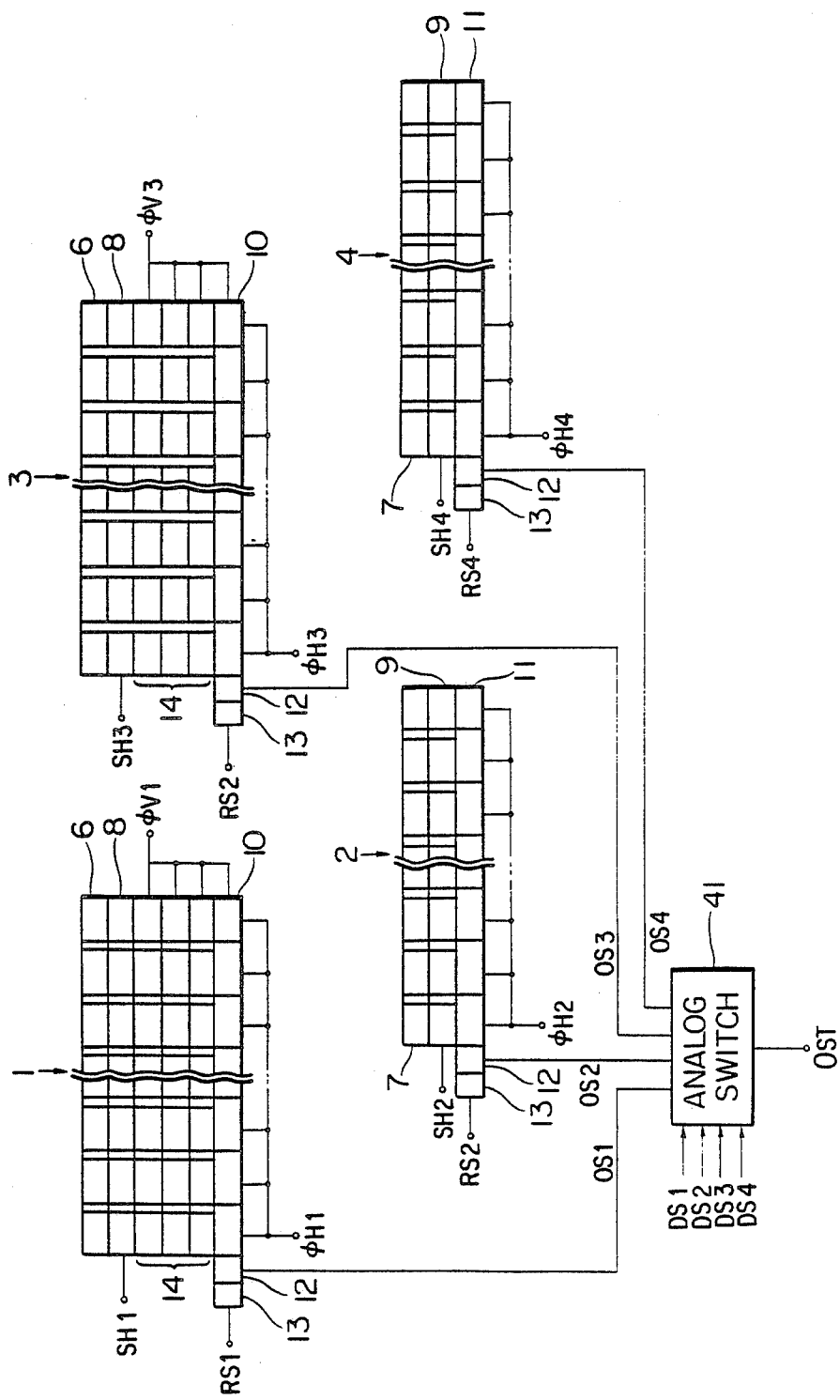
FIG. 4 is a block diagram of the multichip CCD sensor.

In this embodiment, in connection with the line scanning of the original, a plurality of line sensors are arranged zigzag so that the reading positions of adjacent line sensors vary, and the original is read divided. Accordingly, as mentioned previously, there occurs a difference in the reading position (line) between the adjacent line sensors. In order to obtain continuous signals of a line from video signals read out dividing by a plurality of line sensors, at least a signal to be output from the line sensor of the first line which scans the original first is memorized, and is read out synchronized with a signal output from the line sensor of the following second line.

In this case, a method wherein the signal read out from the first line is memorized after being converted to a digital signal, and a method wherein the analog signal before being converted to a digital signal is memorized, are considered.

The former method, since a digitized signal is handled, is preferable in that the handling is easy and that it is less likely to be affected by external influence. However, to store digital signals, a memory of exceedingly large capacity is required. That is, if a digital signal is an 8 bit signal and the difference between adjacent line sensors corresponds to 4 lines, for a line of the aforementioned line sensor comprised of 1000 photosensor elements the storage capacity of at least 8 bits ×1000 photosensor elements ×4 lines =32,000 bits is required, to the disadvantage of this method.

Now, the latter method wherein the analog signal is memorized before being converted to a digital signal will be described in detail.

Description will be made with reference to the drawings.

FIG. 1A is a schematic view of the light receiving surface of a multichip CCD sensor in which line sensor chips 1–4 typically of amorphous silicon wherein a plurality of photosensor elements are arranged in a line are arranged zigzag on a substrate 5. Referring to FIG. 1A, each line sensor chip 1-4 performs main scanning in the arrow (MS) direction, and outputs an analog signal corresponding to the light intensity sensed synchronized with a given clock pulse to the output OUT by a picture element. Each line sensor chip 1-4 is comprised of 1056 photosensor elements, and uses 1024 each out of those elements as effective photosensor elements for reading. Accordingly, a total of 1024×4=4094 photosensor elements are used for image reading, and reading a line in the widthwise direction of A4 size (210 mm×297 mm) at the resolution of 16 picture elements/mm is made possible typically.

In the actual original image reading, the multichip CCD sensor makes relative movement with respect to the original in the direction (indicated by the arrow marked SS) orthogonal to the main scanning direction of the line sensor. Accordingly the line sensor chips 1 and 3 perform the read scanning of the original before the line sensor chips 2 and 4 by a given number of lines (four lines in this embodiment).

FIG. 1B is an enlargement view of the junction of the line sensor chips 2 and 3. 6 and 7 are photosensor element arrays formed on the line sensor chips 2 and 3 respectively. The shaded portion indicates ineffective photosensor elements existing at both ends of the photosensor elements array in the specified quantity (six in this embodiment) which output so-called dummy bits, and adjacent line sensor chips are arranged so as to align the boundaries between those ineffective photosensing elements for reading and effective photosensor elements for reading and also to have a specified line distance (four lines in this embodiment).

8 and 9 are shift gates for the parallel transfer of electric charge accumulated in each photosensor element of the photosensor element arrays 6 and 7 respectively according to the incident light. 10 and 11 are horizontal CCD registers for transferring the electric charge (analog signal) outputted in parallel from the photosensor element arrays 6 and 7 respectively in the main scanning direction serially according to the transfer clock. The electric charge transferred at the horizontal register 10 is conveyed to a voltage signal at an output OUT 12 by each picture element, and is output. 13 is a reset gate for erasing the charge converted to a voltage signal at the output 12, and performs erase operation at the trailing edge of the transfer clock for each picture element. The output and the reset gate are provided also at an end (not shown) of the horizontal CCD register 11.

Between the shift gate 8 of the line sensor chip 3 and the horizontal CCD register 10 is provided a vertical CCD register 14 for transferring the charge outputted in parallel from the shift gate 8. The shift gate 9 of the line sensor chip 2 and the horizontal register 11 are connected directly.

That is, the line sensor chip 3 reads the original before the line sensor chip 2, and the vertical CCD register 14 is provided to delay the output of the line sensor chip 3 by the time corresponding to the difference in the reading position (distance 1). In FIG. 1A, the line sensor chips 1 and 3, and the line sensor chips 4 and 2 are of the same structure respectively.

FIG. 2 is a view showing the structure of a copying equipment in which the multichip CCD sensor shown in FIG. 2 is used. 100 is a reader unit for reading original image and outputting digital video signals VIDEO, 200 is a printer unit for performing image recording based on the digital video signal VIDEO indicating white/black outputted from the reader unit 100.

In the reader unit 100, 21 is the original, 22 is a transparent original holder glass for holding the original 21, 23 is an original holder cover, 24 is an illumination lamp for the original exposure, 25 is a reflector for providing the quantity of light of the illumination lamp 24 to the original efficiently, 26 is a short focal point image forming lens for directing the light from the original, and 27 is the multichip CCD sensor shown in FIG. 1 for converting the photoimage formed by the lens 26 to an electric signal. 28 is a sensor holder capable of making reciprocal movement and holding the illumination lamp 24, the reflector 25, the lens 26, and the multichip CCD sensor 27, 29 is a shaft for holding the sensor holder 28, 30 is a holder for supporting the shaft 29, 31 is a wire for transmitting the force for causing the sensor holder to make reciprocal movement, 32 is a roller for transmitting the driving force of the wire 31, 33 is a driving roller for securing the wire 31 and connected with the rotation driving source, 34 is a driving wire connecting the driving source and the driving roller 33, 35 is a motor serving as the driving source, and 36 is a cable for guiding the output from the multichip CCD sensor 27. 37 is a control processing unit for controlling the output signal of the multichip CCD sensor 27 and controlling the operation of the illumination lamp 24 and the motor 35. 38 is a forward limit switch to be actuated by the sensor holder 28. 39 is a home position sensor of the sensor holder 28. 40 is an operation panel for the operator to input copy command, or the like.

The operation of the reader unit will now be described. Firstly, when a copy command is fed from the operation panel 40, a signal for causing the illumination lamp 24 to light is sent from the control processing unit 37, and the illumination lamp lights. Then, the motor 35 is caused to make normal rotation. Now, the sensor holder 28 starts making forward travel in the arrow A direction. As a result, the original 21 is subjected to read scanning by the multichip sensor 27 which moves in the sub scanning direction line by line of optical image, and the image is converted to electric signals. When the sensor holder 28 arrives at the end of the forward travel, the forward limit switch 38 is actuated, the rotation of the motor 35 is reversed, and the holder 28 starts backward travel. As the home position sensor 39 is actuated, the motor 35 stops, and the sensor holder 27 stops at the home position.

At this time, at the multichip CCD sensor 27, during the forward travel in the A direction, that is, in the sub scanning direction, the line sensor chips 1 and 3 read the image of the main scanning line of the original before the line sensor chips 2 and 4. The above operation will be described with reference to the timing chart of FIG. 3 and the multichip CCD sensor configuration of FIG. 4.

In FIG. 4, the portions indicated by the same numbers as in FIG. 1B have the same functions. 41 is an analog switch for selecting one of 4 outputs of the line sensor chips 1-4 according to a data select signal DS1-DS4 and outputting it, $\phi$H1-4 is a horizontal transfer clock for the transfer operation of the horizontal CCD register 10, 11 of the line sensor chip 1-4, $\phi$V1 and $\phi$V3 are vertical transfer clocks for the transfer operation of the vertical CCD register 14 of the line sensor chips 1 and 3, RS1-4 are reset signals of reset gates 13 of the line sensor chips 1-4, SH1-4 are shift signal for the shift operation of the shift gates 8, 9 of the line sensor chips 1-4, and OS1-OS4 are output signals from the line sensor chips 1-4.

As shown, in the line sensor chips 1 and 3, that is, in the line sensor chips reading the original before the other, both have the vertical CCD register 14 between the shift gate 8 and the horizontal CCD register 10 for 3 lines. The pulse signal in FIG. 3 drives the shift gate at the line sensor chips 1 and 2, and there are shown shift pulses SH1 and SH2 that cause parallel image output. Now, the chip 1 and the chip 2 adjacent thereto will be considered. While the line sensor chip 1 is reading the first line of the original at the original read start position, the line sensor chip 2 is reading the advanced line by three lines before the first line. Then the sensor holder 27 is caused to make a backward travel by the motor 35. Each time the holder 27 moves for a line, the output of the chip 1 reads the second line and the third line sequentially. At the time of 4th line reading, the chip 2 reads the first line.

Accordingly, when the transfer operation of the vertical CCD register provided in the line sensor chip 1 is performed by a vertical transfer clock $\phi V1$ synchronized with a shift signal SH2 to be fed to the line sensor chip 2, a read signal of the same line synchronized with the sub scanning direction is output to the output OS1 of the line sensor chip 1 at the same timing with the output OS2 of the line sensor chip 2.

The horizontal transfer clock $\phi H1$ is controlled so that all picture elements of the chip 1 are transferred from the horizontal CCD register within $\frac{1}{4}$ section (in the case of contact type line sensor chips =4. When the chips =n, 1/n section) of a single line scan section. Read signals of all tips 1-4 are transferred sequentially shifting the phase. Substantially, an analog switch 41 is designed so as to output to an output line OsT as a continuous line of signal for a single line by a sequential operation such as by turning off the switch of that line when the transfer of the chip 1 completes and then turn on the switch for selecting the transfer output of the next chip 2. The analog switch 41 is transferred according to the later-mentioned data select signal DS1-4.

On the other hand, in FIG. 2, the printer 200 is a laser beam printer of the electrophotograph system employing laser beams for image recording based on digital video signals VIDEO from the reader 100.

In the printer 200, 51 is a laser unit which receives a signal VIDEO from the reader 100, modulates laser beam, and outputs it. 52 is a scanner unit for scanning the laser beam, 53 is a BD (beam detect) detection circuit which receives the laser beam and outputs a BD signal for the horizontal synchronization of image recording, or the like, 54 is a photosensitive drum, 55 is a charger for charging the photosensitive drum, 56 is a high voltage unit for supplying a voltage to the charger 55, 57 is a copy sheet held in a cassette, 58 is a feed sheet roller which turns to transfer the copy sheet, 59 is a registration roller for synchronizing the leading edge of the copy sheet with the leading edge of a latent image formed by the radiation of a laser beam on the photosensitive drum surface, 60 is a developer for converting the latent image to a visible image by causing the toner to adhere, 61 is a transfer unit for copying the visible image to the copy sheet to be delivered by the registration roller at a given timing, 62 is a fixer for fusing the toner onto the copy sheet, 63 is a cleaner for removing excess toner on the photosensitive drum 54 after the end of transfer, and 64 is a discharge lamp for removing potential on the photosensitive drum surface.

Operation will now be described.

The photosensitive drum is charged by the charger 55 to a uniform potential. A signal VIDEO from the reader unit 100 is output as a modulation signal of the laser beam by the laser unit 51. The laser unit 51 emits a laser beam modulated according to the VIDEO signal, and the laser beam is deflection scanned by the scanner unit 52 in the direction orthogonal to the drum rotation direction. A latent image formed on the photosensitive drum 54 is converted to a visible image by the developer. On the other hand, the toner on the drum 54 is transferred to the copy sheet transferred synchronized by the registration roller by the action of the transfer unit 61, and the copy sheet is discharged outside after the toner image is fixed thereon by the fixer 62.

Figure 5A:
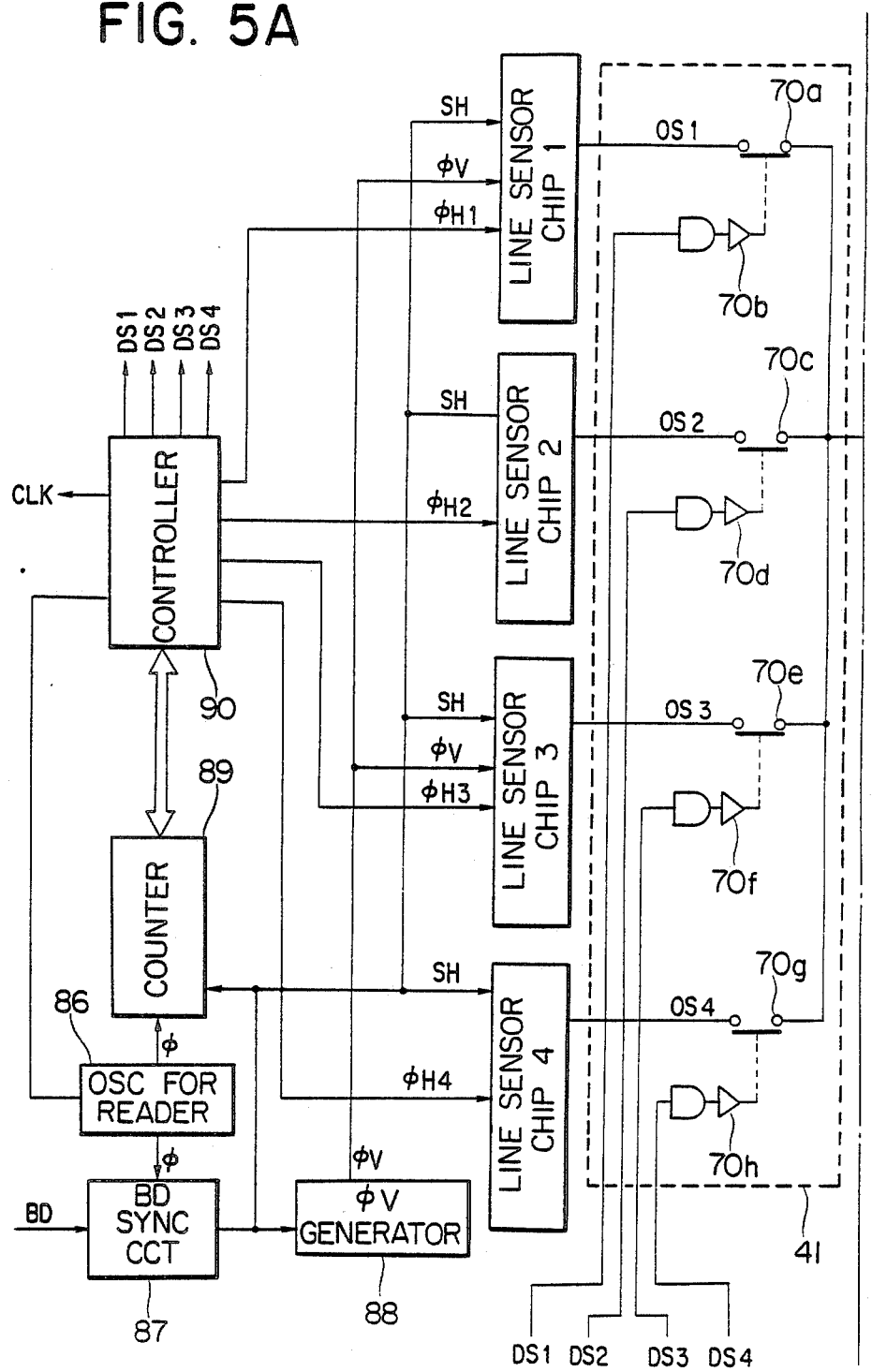
FIG. 5, composed of FIGS. 5A and 5B, is a typical circuit diagram.
Figure 6:
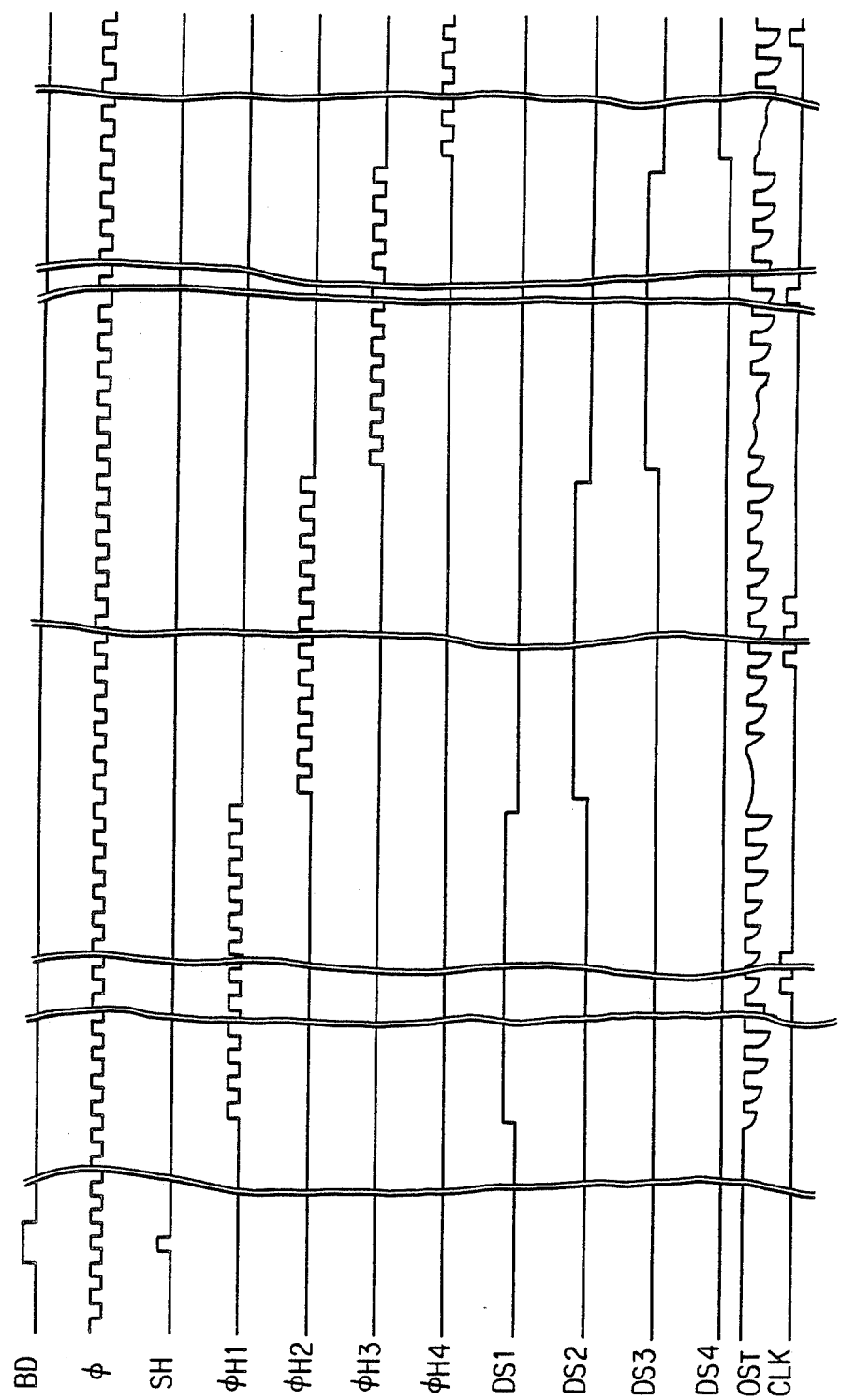
FIG. 6 is a timing chart showing the output condition of each part.

FIG. 5 shows a typical block diagram of the reader unit 100, and FIG. 6 shows the output image timing.

In FIG. 5, 70a and 70b are analog switches for switching the output OS1 of the chip 1, 70c and 70d are analog switches for switching the output OS2 of the chip 2, 70e and 70f are analog switches of the chip 3, and 70g and 70h are analog switches of the chip 4. (The portion enclosed with a broken line corresponds to the analog switch 41 in FIG. 4) 71 is a sample hold circuit to make the output time of output signal constant. 72 is an amplifier for signal amplification, 73 is an A/D converter for converting the analog signal to a digital signal of predetermined bits, 74 is a comparator for comparing a digital signal with the threshold value and forming a binary signal indicating white/black, 75 is a dither ROM for outputting digital data stored in advance by address to the comparator as a threshold value, 76 is a dither counter for determining the output address of the dither ROM 75, 77 and 79 are RAMs for storing bit data obtained by the comparison of the dither ROM numerical value and image data at the comparator, 79 is a selector for supplying read and write addresses to the RAM 77, 81 is an inverter inverting signals to be alternately output at each section of 2BD section from a sync control circuit 85 synchronized by the sync signal for each line from the printer 200 and the signal BD, 82 is an oscillator for adjusting the signal output to the characteristic (speed) of the printer 200, 83 is a read counter for counting oscillated clock $\phi p$ from the printer oscillator 82, 84 is a write counter for counting clock synchronized with the read operation of the reader unit 100, 85 is a sync control circuit for controlling read/write of RAMs 77, 78.

86 is an oscillator for determining the transfer of the read output of the multichip CCD sensor, 87 is a BD sync circuit for synchronizing signal from the reader oscillator 86 with the BD signal from the printer 200 and also generating SH pulse to the multichip CCD sensor, 88 is a generator for generating vertical transfer clock $\phi V$ for operating the vertical transfer registers of odd numbered chips of the CCD, i.e., the line sensor chips 1 and 3, 89 is a counter for performing counting operation by the oscillation signal $\phi$ of the reader oscillator 86 and SH pulse, and 90 is a controller for generating horizontal transfer clock $\phi H1-\phi H4$ to cause all line sensor chips to perform transfer operation during the SH signal period according to the count value of the counter 89 according to the reader oscillator 86 and also for generating switching signal DS1-DS4 of the analog switch 41.

Now, the operation of FIG. 5 will be described. Synchronization of the oscillation signal $\phi$ from the reader oscillator 86 and the BD signal from the printer 200 is performed at a BD sync circuit 87, and the shaped BD signal is fed to the SH terminal of each chip as an SH pulse. As a result, charge is transferred in parallel from the photosensor element of each chip. Now, odd numbered chips, i.e., the line sensor chips 1 and 3 which read the original before the others, transfer the charge by the vertical transfer clock $\phi V$ at the vertical CCD register 14. In the real size reading, a pulse which is the same as the shift pulse SH for driving the shift gate is applied as $\phi V$.

As a result, after the line outputs of odd numbered chips are delayed through the vertical CCD register corresponding to picture elements which differ in space, they are outputted, in parallel with the line outputs of the adjacent even numbered chips, in synchronism with the BD signal. At this time, at the horizontal CCD register 10 of the chip 1 all picture elements are transferred during $\frac{1}{4}$ of the SH section by the horizontal transfer pulse $\phi H1$ which controls the controller 90 as shown in the timing chart of FIG. 6. In addition, it is seen that to the adjacent chip 2 a horizontal transfer pulse $\phi H2$ is output after the end of aforementioned horizontal transfer pulse $\phi H_1$. In this manner, it is seen that picture elements of all chips of the multichip CCD sensor for one line are sequentially transfer output to the analog switch 41 within the SH section.

When the analog switch 41 is used at the junction of the outputs of a plurality of line sensor chips, switching time delay occurs. However, as mentioned above, since dummy picture elements other than effective picture elements exist before and after the output of each line sensor chip, it is designed so that the analog switch 41 responds during this time. The dummy picture elements are removed by the method described later.

Now, when the system is designed as described above, the output $OS_T$ of the analog switch 41 is output in the waveform as shown in the timing chart of FIG. 6 with the picture element data at the analog level. This is subjected to sample hold at the sample hold circuit 71, the signal value is corrected so as to correspond with the rated value of the A/D converter 73 at the amplifier 72, and analog value is converted to a digital value, making a digital signal of a given bits.

In order to perform dither processing for outputting the above digital signal to the printer 200 converting it to a dot data indicating white/black, an address is read out from the dither counter 76 to the dither ROM 75, and is output. At this time, a clock CLK rid of transfer clock for the dummy picture elements is applied from the controller 90. Accordingly, since the dither matrix does not become non-continuous at the joint between the line sensor chips 1 and 2, the reproduced image becomes free of imperfection, typically, stripes.

The dot data obtained by a comparison of the value of dither ROM 75 thus output and the video signal is stored either in the line memory RAM 77 or 78. The line memory RAM 77 is selected when the WE terminal of the sync control circuit 85 becomes low. At the selector 79 the write address bus from the write counter 84 is selected. As a result, the output of the write counter 84 is fed to the address line. At this time, since the write counter 84 counts the clock rid of the transfer clock for the dummy picture elements from the controller 90 similar to the dither counter 76, no bit data of the picture elements is stored in the RAM 77.

On the other hand, when the sync control circuit 85 causes the WE terminal to become high, the chip selector CS becomes low. Accordingly data of the line immediately before which is stored in the RAM 77 is read out, and is output to the printer 200 as a continuous video signal VIDEO having been rid of the dummy picture element component. At the same time, dot data presently being output from the comparator 74 is stored in the RAM 78. In this manner, the RAM 77 and 78 perform memory write and read alternately, and synchronize the video signal VIDEO with the printer.

While the number of line sensors described herein is 4, since the number of line sensors depends on the desired resolution, the size of the original to be read, and so forth, it is apparent that more than two line sensors may be used.

A case where odd number (2n+1, where n is an integer 1 or more) line sensor chips will be described below.

In this case, the number of line sensors of the first line which read the original before the others depending on the multichip CCD sensor moving direction with respect to the original is either "n" or "n+1". On the other hand, as mentioned previously, it is required to provide the vertical CCD register for delaying the read signal of the first line corresponding to the difference in the read position. Accordingly, as many as n line sensors are provided in the first line, and as many as n+1 line sensors are provided in the second line. In addition, a vertical CCD register is provided in each of n line sensors.

In the arrangement as such, the number of vertical CCD registers is smaller by one compared with n+1 line sensors are provided in the first line, and it is favorable in terms of cost.

In addition, the broad concept of the present invention is applicable to readers employing the so-called reduced optical system without being limited to the contact reading system.

In addition, though the photosensor element of amorphous silicon is used in the embodiment described herein, that typically of crystalline silicon or cadmium sulfide may be used.

In addition, the arrangement of a plurality of line sensors is not limited to the zigzag fashion, and it is apparent that the arrangement wherein the read position differring for a certain number of lines may be applied.

In addition, the output units is not limited to the laser beam printer, but an ink jet printer, a thermal printer, or other printer may be used. Or it may be an image file for storing image data.

As so far described, an original reader set free of yield-related and cost-related problems of the line sensor is provided by reading the image by a plurality of line sensors, a single line image signal free of difference in position between adjacent line sensors, and excellent image reproduction free of deviation can be obtained by using the video signal obtained by the reading in this manner.

What is claimed is:
1. An original reader comprising:
   a plurality of line sensor chips provided on a substrate and each having a plurality of photosensor elements, said line sensor chips being arranged such that lines read by adjacent line sensor chips mutually differ, said chips being arranged to read an original image on a division basis and image reading areas of the adjacent line sensor chips being partially overlapped;

means for causing relative movement of said plurality of line sensor chips and an original, for reading the original image, in a direction perpendicular to a scanning direction of said plurality of line sensor chips;

delay means for delaying an analog output of the line sensor chip which scans the original before others of said plurality of line sensor chips by a predetermined time; and means for eliminating, from outputs of said plurality of line sensor chips, outputs corresponding to said overlapped image reading areas.

2. An original reader according to claim 1 wherein said delay means performs delay operation by time corresponding to the difference in the read position of adjacent line sensor chips.

3. An original reader according to claim 1 wherein said delay means is memory means for storing the analog output of the line sensor chip which scans the original before others.

4. An original reader according to claim 3 wherein said memory means is a parallel register for parallel shifting the analog output which is extracted parallelly from each photosensor elements of said line sensor.

5. An original reader according to claim 1 further comprising selection means for selectively outputting the output of said delay means and the output of the line chip which scans the original later on the time division basis.

6. An original reader according to claim 1 further comprising a moving member operable to move together with said plurality of line sensor chips, said moving member being provided with a light source for exposure of the original and optical means for causing an optical image from the original to be introduced into said plurality of line sensor chips.

7. An image reading device comprising:
a substrate;
a plurality of line sensor chips provided on said substrate and each having a plurality of photosensor elements, said line sensor chips being arranged in a zigzag fashion on first and second lines which are spaced with a predetermined interval, and being arranged to read an image on a division basis;
a plurality of parallel registers provided on said substrate each for shifting in parallel analog signals outputted in parallel from each of the photosensor elements of the line sensor chips associated with at least one of the first and second lines, in synchronism with an externally provided shift signal; and
a plurality of serial registers provided on said substrate each for serially outputting the analog signals outputted in parallel from each of said parallel registers or each of said photosensor elements of said line sensor chips.

8. An image reading device according to claim 7 further comprising drive means for outputting the analog signals from said plurality of serial registers on a time division basis.

9. An image reading device according to claim 7 wherein each of said parallel registers performs shift operation synchronized with a line sync signal.

10. An image reading device according to claim 7 wherein said plurality of line sensors are arranged throughout the width of the original to be read.

11. An image reading device according to claim 7 wherein each of said parallel registers is operable to delay the analog signals in accordance with the spatial interval between the first line and the second line.

12. An image reading device according to claim 7 wherein said plurality of serial registers are provided in a corresponding relation with said plurality of line sensor chips, respectively.

13. An image reading device according to claim 7 wherein each of said plurality of parallel registers is operable to delay the analog signals from each of the photosensor elements of the line sensor chips and to supply in parallel the delayed analog signals to the associated one of said plurality of serial registers.

14. An original reader comprising:
reading means having a plurality of $2n+1$ (where n is an integer) line sensors for reading an original image on a division basis, respective image reading areas of adjacent line sensors being partially overlapped, wherein n said line sensors are arranged on a first line which read an original in advance, and $n+1$ said line sensors are arranged on a second line which read the original following said first line;
means for causing relative movement of said plurality of line sensors and an original, for reading the original image, in a direction perpendicular to a scanning direction of said plurality of line sensors;
delay means for outputting analog signals from n line sensors of the first line delayed by a predetermined time; and
means for eliminating, from outputs of said plurality of line sensors, the outputs corresponding to said overlapped image reading areas.

15. An original reader according to claim 14 wherein said delay means is memory means for storing analog outputs from n line sensors of the first line.

16. An original reader according to claim 15 wherein said memory means outputs stored analog output after a time corresponding to the interval between the first line and the second line.

17. An original reader according to claim 15 wherein said memory means is a parallel register for shifting in parallel the output of each photosensor element of n line sensors of the first line.

* * * * *

UNITED STATES PATENT AND TRADEMARK OFFICE
CERTIFICATE OF CORRECTION

PATENT NO. : 4,734,787          Page 1 of 3
DATED     : March 29, 1988
INVENTOR(S) : KIMIYOSHI HAYASHI It is certified that error appears in the above-identified patent and that said Letters Patent is hereby corrected as shown below:

COLUMN 1

Line 21, "phtotsensor" should read --photosensor--.
    Line 25, "stivity" should read --sitivity--.
    Line 41, "typcially," should read --typically,--.

COLUMN 3

Line 9, "1024X4=4094" should read --1024X4=4096--.

COLUMN 4

Line 40, "multichip sensor 27" should read
          --multichip CCD sensor 27--.
    Line 41, "sub scanning" should read --subscanning--.
    Line 47, "sensor holder 27" should read --sensor holder 28--.
    Line 50, "sub" should read --sub---.
    Line 63, "chip" should read --chips--.
    Line 68, "signal" should read --signals--.

COLUMN 5

Line 15, "holder 27" should read --holder 28--.
    Line 16, "holder 27" should read --holder 28--.
    Line 25, "sub scanning" should read --subscanning--.
    Line 33, "tips 1-4" should read --chips 1-4--.
    Line 38, "turn" should read --turning--.

UNITED STATES PATENT AND TRADEMARK OFFICE
CERTIFICATE OF CORRECTION

PATENT NO. : 4,734,787
DATED : March 29, 1988
INVENTOR(S) : KIMIYOSHI HAYASHI

It is certified that error appears in the above-identified patent and that said Letters Patent is hereby corrected as shown below:

COLUMN 6

Line 57, "odd numbered" should read --odd-numbered--.

COLUMN 7

Line 5, "odd num-" should read --odd-num---.
    Line 12, "odd numbered" should read --odd-numbered--.
    Line 16, "even numbered" should read --even-numbered--.
    Line 44, "given bits." should read --given number of bits.--.
    Line 46, "200" should read --200,--.

COLUMN 8

Line 1, "Accordingly" should read --Accordingly,--.
    Line 31, "is" should be deleted.
    Line 47, "units" should read --unit--.

UNITED STATES PATENT AND TRADEMARK OFFICE
CERTIFICATE OF CORRECTION

PATENT NO. : 4,734,787
DATED : March 29, 1988
INVENTOR(S) : KIMIYOSHI HAYASHI

It is certified that error appears in the above-identified patent and that said Letters Patent is hereby corrected as shown below:

COLUMN 9

Line 24, "each" should read --the--.
Line 28, "chip" should read --chips--.

Signed and Sealed this

Twenty-second Day of November, 1988

Attest:

DONALD J. QUIGG

*Attesting Officer*    Commissioner of Patents and Trademarks